May 22, 1956 H. A. KUNTZ 2,746,153
SHEET GLASS CUTTING MACHINE
Filed July 9, 1951 6 Sheets-Sheet 1

Inventor
Harry A. Kuntz
By Nobbe & Swope
Attorneys

May 22, 1956 H. A. KUNTZ 2,746,153
SHEET GLASS CUTTING MACHINE
Filed July 9, 1951 6 Sheets-Sheet 2
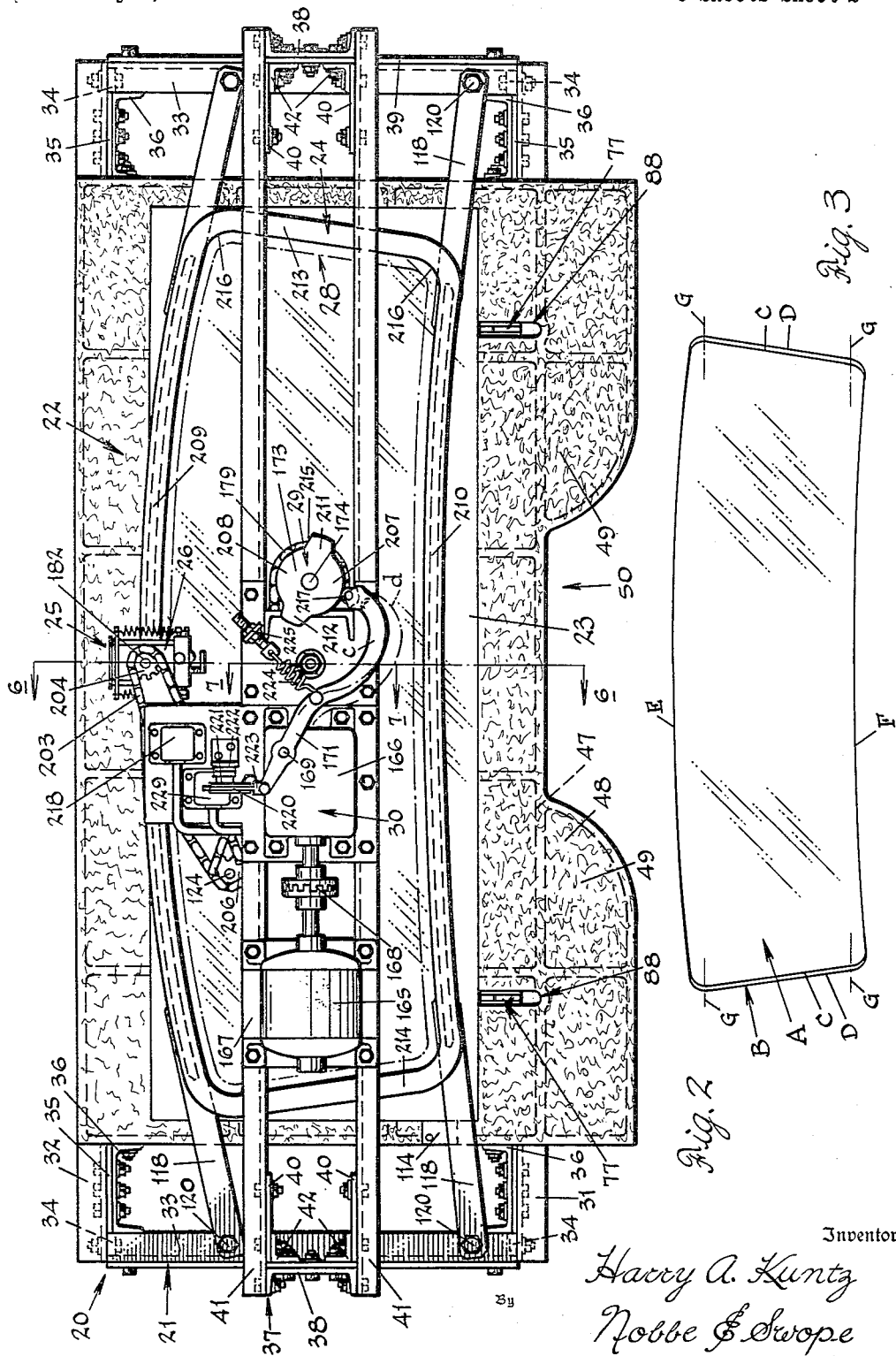
Inventor
Harry A. Kuntz
Nobbe & Swope
Attorneys May 22, 1956      H. A. KUNTZ      2,746,153
SHEET GLASS CUTTING MACHINE
Filed July 9, 1951      6 Sheets-Sheet 3
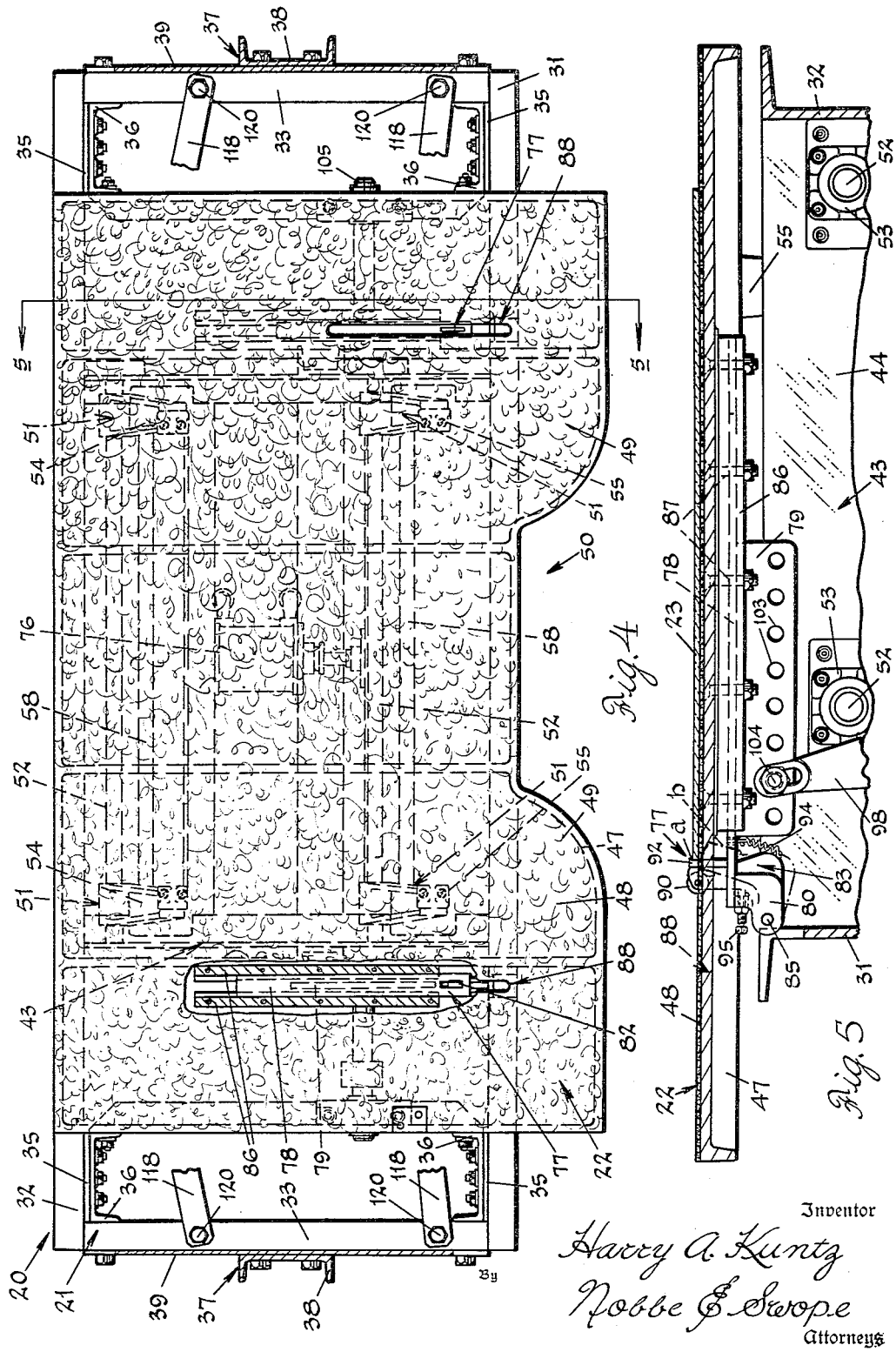
Inventor
Harry A. Kuntz
Nobbe & Swope
Attorneys May 22, 1956 H. A. KUNTZ 2,746,153
SHEET GLASS CUTTING MACHINE
Filed July 9, 1951 6 Sheets-Sheet 4
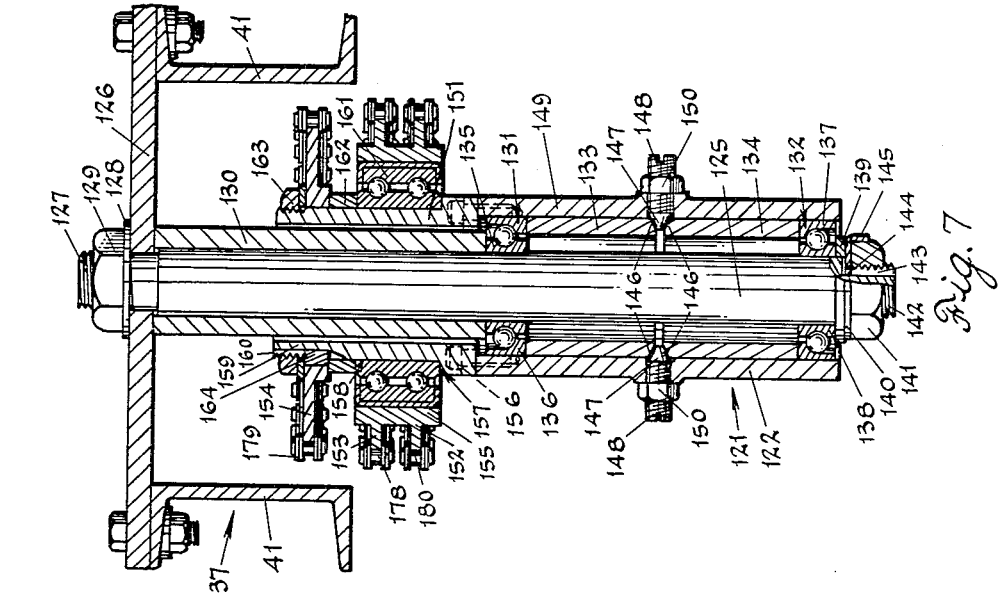
Inventor
Harry A. Kuntz
Nobbe & Swope
Attorneys May 22, 1956  H. A. KUNTZ  2,746,153
SHEET GLASS CUTTING MACHINE
Filed July 9, 1951  6 Sheets-Sheet 5

Inventor
Harry A. Kuntz
Nobbe & Swope
Attorneys

May 22, 1956      H. A. KUNTZ      2,746,153

SHEET GLASS CUTTING MACHINE

Filed July 9, 1951      6 Sheets-Sheet 6

Inventor
Harry A. Kuntz
By Nobbe & Swope
Attorneys

United States Patent Office 2,746,153
Patented May 22, 1956

---

2,746,153

SHEET GLASS CUTTING MACHINE

Harry A. Kuntz, Toledo, Ohio, assignor to Libbey-Owens-Ford Glass Company, Toledo, Ohio, a corporation of Ohio Application July 9, 1951, Serial No. 235,824

12 Claims. (Cl. 33—27)

This invention relates broadly to sheet cutting apparatus. More particularly, it has to do with an improved machine of the so-called template type upon which predetermined outlines can be rapidly, accurately and efficiently cut from sheets of glass or like materials.

The machine, herein set forth as a preferred embodiment of the invention, is intended for use in the cutting of relatively large and elongated patterns of glass, suitable for one-piece windshields, and whereby successive sheets will be cut to exactly the same size and shape.

It is a primary aim of this invention to provide a cutting machine of the character above described which is substantially automatic in operation and in which the travel of the glass cutting unit over a suitable template and in cutting relation to a glass sheet will be initiated after the table carrying the properly positioned sheet has been elevated, said travel being progressively retarded or accelerated according to the template outline; and in which the cutting unit when stopped operates to lower the table which in turn automatically produces removal of the sheet therefrom.

Another object of the invention is the provision, in a machine of the above character, of a control for the travel of the glass cutting unit which governs the rate of travel according to the area of the template over which the unit is moving, to the end that the cutting tool carried on the template will effect a uniform and regular depth of cut in the glass and along the predetermined outline of the template.

Another object of the invention is to provide a machine of the above character which is embodied in a rigid structure adapted to support relatively large sheets of glass or like materials, and an adequate cutting unit for cutting a predetermined outline therefrom, whereby such cut outlines can be repeatedly reproduced on successive sheets in a rapid and uniform manner.

A further object of the invention is the provision, in a machine of the above character, of means for locating a sheet of glass or like materials, said means being adapted to substantially disappear during loading of the glass, to then be positioned for locating the same, and to ultimately operate to remove the cut glass from the machine.

Other objects and advantages of the invention will become more apparent during the course of the following description, when taken in connection with the accompanying drawings.

In the drawings, wherein like numerals are employed to designate like parts throughout the same:

Fig. 2 is a top or plan view of the cutting machine;

Fig. 3 is a plan view of two sheets of glass that have been pattern-cut on the machine;

Fig. 4 is a horizontal, sectional view taken substantially on line 4—4 of Fig. 1;

Fig. 5 is a fragmentary, vertical, transverse, sectional view taken substantially along the line 5—5 of Fig. 4;

Fig. 6 is a vertical, transverse sectional view taken substantially on line 6—6 of Fig. 2;

Fig. 7 is an enlarged, sectional view taken substantially on line 7—7 of Fig. 2;

Fig. 8 is an enlarged, fragmentary, detail view taken substantially on line 8—8 of Fig. 6;

Figure 1:
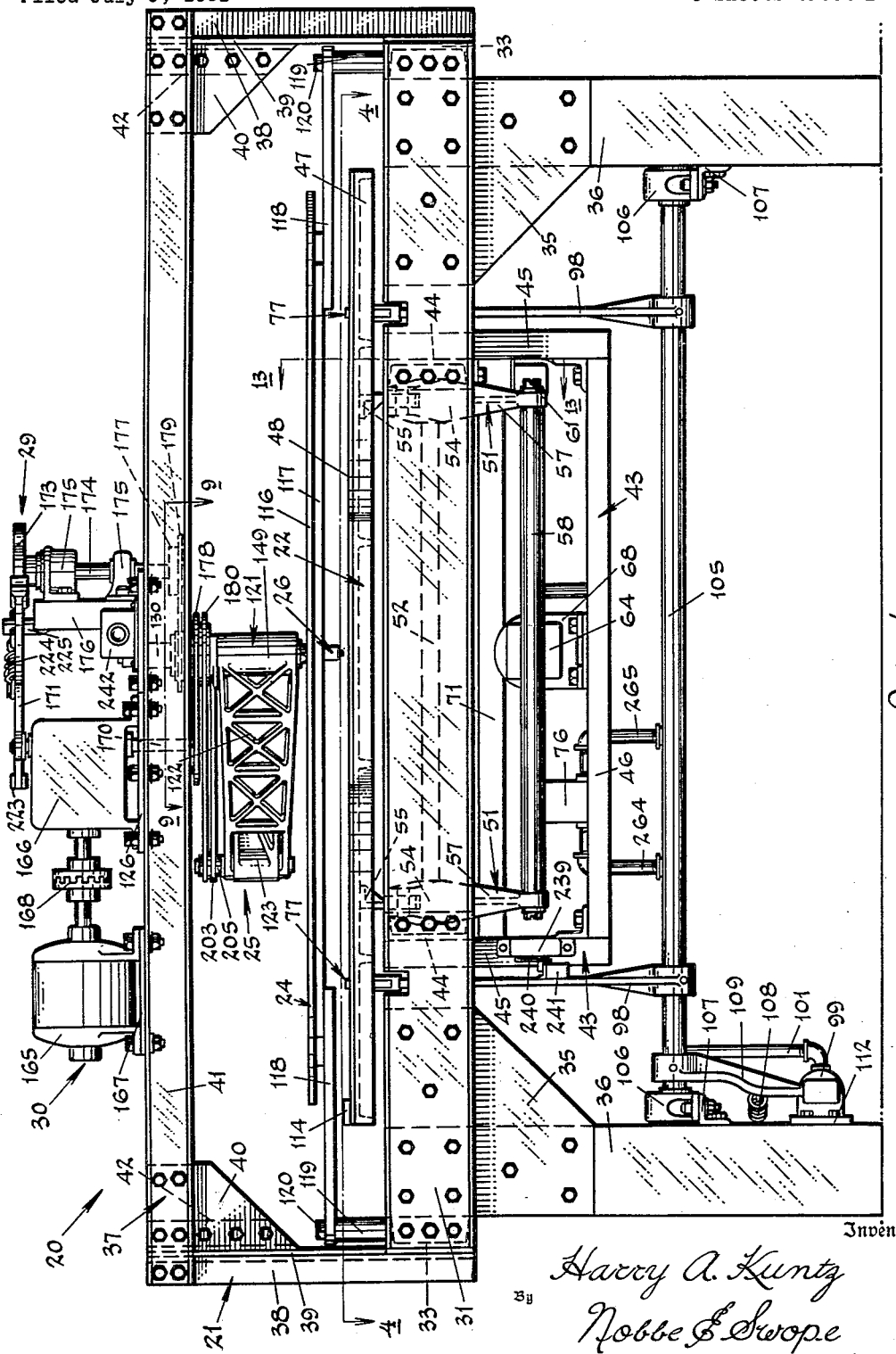
Fig. 1 is a front elevation of a sheet glass cutting machine, constructed in accordance with the invention.

Referring now more particularly to the drawings, there is illustrated therein a sheet glass cutting machine, constructed in accordance with the invention and designated in its entirety by the numeral 20. Briefly stated, as shown in Fig. 1, this cutting machine comprises a supporting structure or frame 21 having associated therewith a horizontal, flat table 22 for supporting a sheet of glass or the like 23 during the cutting thereof. Arranged above the table 22 in vertically spaced relation is a horizontally disposed track template 24 having the same configuration as the form or patterned outline to be cut from the sheet 23. Mounted upon the track 24 and guided thereby is a cutting mechanism, generally indicated by the numeral 25, including a cutting unit 26 provided with a cutting wheel 27 (Figs. 10 and 11), said unit being adapted to travel around the template 24 to score the glass sheet 23 along the line, indicated at 28 in Fig. 2.

In accordance with the invention, means is provided for raising the table 22, and glass sheet 23 supported thereon, prior to the cutting operation, and for maintaining them in elevated position during said cutting operation. Upon completion of the cutting operation, the table is automatically lowered and the sheet removed therefrom. Means is also herein provided for controlling the traversing speed of the cutting unit 26 along the track template 24 by means of an especially designed cam member 29 which is rotated in synchronized relation to the movement of the cutting unit 26 by a drive mechanism, designated in its entirety by the numeral 30.

*Frame construction*

As stated above, the cutting machine 20 comprises a frame 21 and a vertically movable table 22 carried thereby. The frame 21 is embodied in a horizontal and substantially rectangular arrangement of structural channels which include a front channel member 31, a similar rear channel member 32 and end members 33 at the respective ends of the channel members 31 and 32. The end channel members 33 are provided in their ends with filler plates 34. The channel members 31, 32 and 33, with the plates 34, are interconnected in rigid relation by means of gusset plates 35 to which are also secured standards or legs 36 by suitable nut and bolt connections or the like.

A bridging structure 37 is carried above the channel members 31, 32 and 33 by upright channels 38 and suitable gusset plates 39 and 40 and includes longitudinally arranged parallel channel members 41 which are generally located in the longitudinal axis of the machine. The gusset plates 39 are fixedly secured to the end channel members 33, as shown in Figs. 1 and 2, and carry on their outer surfaces the upright channels 38 and on their inner surfaces, angles 42 are secured to which the gusset plates 40 are attached. The channel members 41 are thus mounted on and braced in relation to the uprights 38 and plates 39 and 40 by suitable nut and bolt connections or the like.

Spaced equidistantly from the end members 33 is a downwardly depending structure 43 which comprises transversely disposed channels 44, vertically disposed channels 45 and a horizontal channel 46 extending longitudinally therebetween. On this structure 43, the glass supporting table 22 and the actuating mechanism for elevating and lowering the same are carried.

Glass supporting table

Upon reference to Figs. 4 and 5, it will be seen that the table 22 generally comprises a flat plate 47 of suitably under-ribbed construction which is covered on its upper surface by a layer of felt 48 or the like to protect the surface of the glass sheet from mars or scratches while being placed thereon or removed therefrom. The table 22 generally spans the width of the frame 21 but more particularly is provided with forward corner areas 49 which overhang the frame and afford a central open area, generally indicated at 50, for convenience of the operator while loading the glass.

The table 22 is carried in its vertical movements to elevate the glass sheet 23 into position for cutting and subsequently to lower the same by means of a plurality of bell-cranks 51 which are actuated in unison, in a manner to be more fully hereinafter described. The bell cranks 51 are mounted on shafts 52 that are longitudinally disposed with reference to the machine frame 21 and are journaled at their ends in bearings 53 carried by the transverse channels 44 of the structure 43. As shown in Fig. 6, the upper portion or arm 54 of each bell crank 51 is bifurcated and pivotally connected to the table 22 by means of a bracket 55 secured thereto, said bracket having a journal opening for a pin 56 extending therethrough and supported at its ends in the arm 54.

The lower ends or arms 57 of the bell cranks 51 are interconnected in pairs and in their entirety by means of rods 58 between the longitudinally associated bell cranks and bars 59 between the transversely disposed bell cranks. These rods 58 and bars 59 are pivotally interjoined with each bell-crank in a manner substantially as shown in Fig. 8 wherein it will be seen that the ends of the rods 58 are tapped to receive the threaded end 60 of a shoulder bolt 61 while the ends of the arm portions 57 and the bars 59 are bored to receive the cylindrically formed shank 62 of the bolt. The bell-cranks 51, at their lower ends, and the bars 59 will thus be adapted to pivot relative to the rods 58 and on the cylindrical shank 62 of the bolts and the rods will cause the forward and rearwardly disposed pairs of bell-cranks to move in unison while the bars 59 will "tie" the transversely associated bell-cranks together to produce a unison of action and equalized, vertical movement of the table 22.

The bars 59 are further interrelated by means of a cross-bar 63 which also carries in a position equidistant from said bars 59 and closely adjoining their forward ends a striker plate 64. The plate 64 is engaged by a suitably formed outer end 65 of a piston rod 66. Preferably the end 65 may be equipped with a buffer plate 67 of a hard fiber composition to reduce the sound of impact and also wear upon the engaging surfaces. The piston rod 66 is an integrally associated part of a cylinder 68 by whose operation the bell-cranks 51 are caused to raise and lower the table 22. The cylinder 68 is mounted on a plate 69 secured to and extending rearwardly from the horizontal channel 46 of the structure 43.

Figure 16:
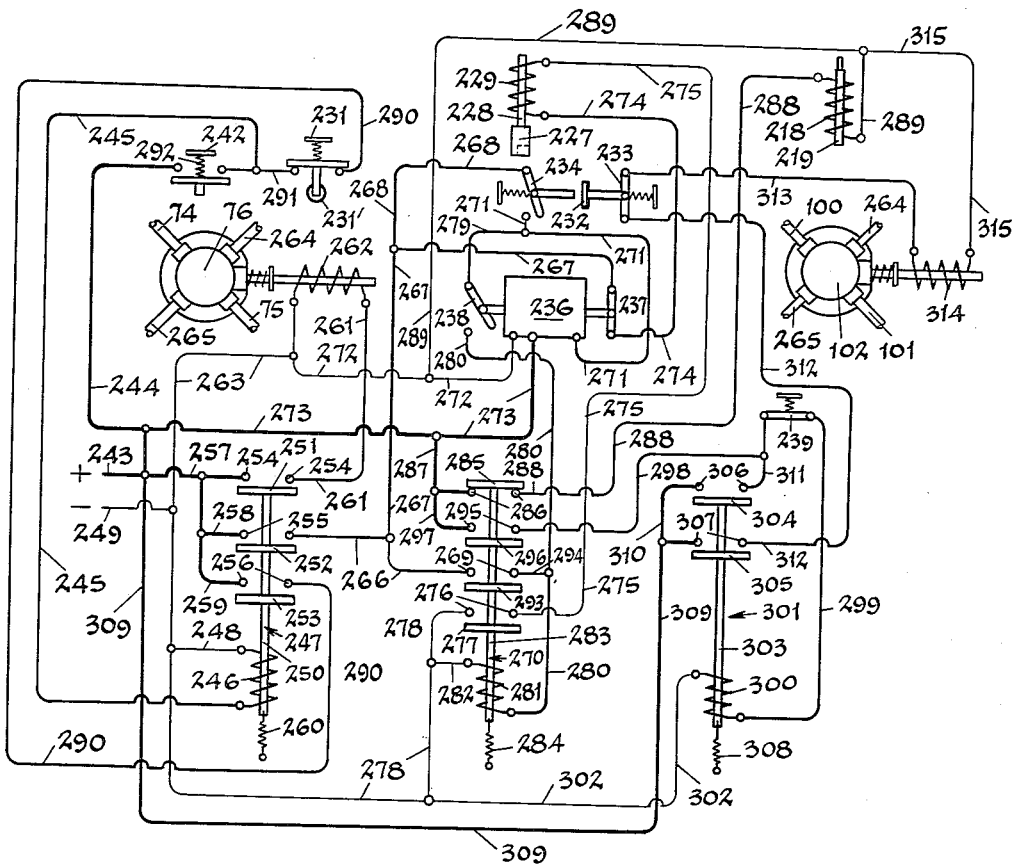
Fig. 16 is a diagrammatic view of the electrical system for automatically operating the machine.

Obviously the cylinder 68 may be of a type having a predetermined stroke but in order to afford a range of vertical adjustment for the table 22, means is herein provided to limit the swing or "throw" of the bell-cranks and thereby stop the action of the cylinder 68 in at least one direction or when it is actuated to raise the table. This limiting means comprises a pair of bolts 70, threaded into the depending leg of an angle 71 secured at its ends to the transverse channels 44. The bolts, one of which is shown in Fig. 6, are equipped with fiber headed portions 72 and locking nuts 73 on the side of the angle opposite said headed portion. As will be more fully discussed in connection with the system diagram shown in Fig. 16, the cylinder 68 is connected by pipes 74 and 75 to an electrically or solenoid operated valve 76.

The glass sheet locating and ejecting mechanism

The glass supporting table 22 is also provided or has associated therewith locating devices 77 for the glass sheet 23 which are constructed so as to literally disappear during loading of the sheet and susbequently function after the sheet has been cut, to rapidly eject or move the sheet from said table. These locating devices are shown in detail in Figs. 4, 5, 6 and 13 wherein it will be seen that the body of the device 77 is made up of a horizontally disposed plate 78, a vertical depending rib 79 and simlarly formed ears 80. Between the ears 80 and the adjacent end of the rib 79, the plate 78 is provided with a slot 81 within which the upstanding portion 82 of a plate 83 is located. A laterally extending portion 84 of said plate 83 is disposed between the ears 80 and pivotally carried on a pin 85.

The plate 78 is carried in slidable relation to the table 22 by means of guide plates 86, secured to the under surface of the table by machine screws 87, to be enabled to move the upstanding portion 82 of the plate 83 through and in aligned relation with a slot 88 formed in the plate 47 of said table and also the felt layer 48 as shown in Fig. 4. This upstanding portion 82 has a bifurcated end 89 in which a roller bearing 90 is located and carried on a pin 91. Bridging the bifurcated end, behind the roller bearing 90, is a fiber composition plate 92 secured thereon by screws 93.

As will be noted in Fig. 5, when the glass sheet is initially placed on the table, the leading edge or surface thereof will engage the roller bearing 90 to deflect the plate 83 downwardly beneath the surface of the table until the rear edge of the sheet has passed thereover. The plate 83 will accordingly be movable from a position shown in full line $a$ to a position substantially as shown in broken line $b$. Once the rear edge of the sheet has passed over and beyond the roller bearing 90, a spring 94 attached to the plate 83 and the plate 78, causes the said plate 83 to resume its original and exposed position. The sheet is now slid backward (with respect to its loading movement) until the following edge contacts the fiber plates 92. To properly align the sheet of the plate 83 of each locator device 77, a set screw 95 is threaded into the web 96 between the ears 80 and against the upstanding portion 82 of said plate. When a position of relative alignment has been obtained between the plates 83 of the locator devices, the set screws may be locked from movement by nuts 97.

The locator devices 77 are caused to move or reciprocate as the plates 78 thereof slide within the guide plates 86 by means of hydraulically actuated arms 98. Briefly, the arms 98 are caused to move the locator devices 77 by means of a cylinder 99 that is connected by pipes 100 and 101 to an electrically or solenoid operating valve 102 which in turn is activated in sequence and according to the general system diagrammatically shown in Fig. 16.

More particularly, each of the locator devices 77 is provided in the vertical rib 79 with a number of regularly spaced holes 103 and the adjoining end of each arm 98 is bifurcated and drilled to carry a bolt 104 that may be inserted through a selected hole 103. The holes 103 are provided to enable the locator devices 77 to be adjusted forwardly or rearwardly within the table slots 88 until a desired aligning position for a glass sheet has been obtained with reference to the track template 24. That is—when the predetermined width of a sheet of glass with reference to a particular template necessitates a re-positioning of the locator devices to properly locate the leading and following sheet edges with reference to the associated side portions of the template, the bolts 104 may be removed from the ends of the arms 98 and the locator devices adjusted laterally of the table and until another hole 103 substantially registers with the drilled openings in the bifurcated ends of the arms. Obviously the width of the sheet may be computed to allow a reasonable amount of marginal selvage at each edge of the sheet and according to the range of adjustment afforded by the holes 103. Once these adjustments have been effected, the bolts 104 can be replaced in the arm ends and the rib 79 to re-establish their pivotal relationship.

The arms 98 are mounted on a shaft 105 that is journaled at its ends in pillow bearings 106 carried on angle 107 secured to the legs 36 of frame 21. This shaft is rotated or, more specifically, caused to oscillate by means of the cylinder 99 in one direction and by a spring 108 in the opposite direction. For this purpose, an arm 109 is secured to shaft 105 to extend downwardly therefrom and be engageable by the outer end 110 of the piston rod 111 of cylinder 99. The cylinder 99 is mounted on a plate 112 secured to and extending between the legs 36 at one end of the frame 21. The spring 108 is attached at one of its coiled ends to a post 113 affixed to the plate 112 and at its opposite coiled end to the arm 109. Thus, according to the operations of the cylinder 99 by the solenoid actuated valve 102, the piston 111 will be caused to engage and move the arm 109, thereby rocking the shaft 105 and the arms 98 in one direction and distending the spring 108 while, upon reversal of the valve 102 and consequently a change in direction of the pressure to said cylinder, the spring 108 will co-act to retract the piston rod and swing the arm 109 in the opposite direction. In this retracted position of the piston rod, as shown in Fig. 6, the arms 98 are located so that the locator devices 77 will be disposed for the proper arrangement of a sheet of glass on the table 22.

In this embodiment of the invention, it is intended to obtain relatively long pattern-cut outlines from suitably large size sheets of glass, and these are both heavy and unwieldy so that the table is specially designed to aid in the rapid and simple loading of the glass thereupon. In so doing, the glass is placed on areas adjoining the overhanging table corners 49 and slid over the felt surface 48. Being moved forwardly on the table in this manner, the leading sheet edge engages the roller bearings 90, causing the locator devices 77 to be deflected downwardly substantially beneath the surface of the table and allowing a rolling contact to be created between the sheet surface and the bearings until the following or rear edge has passed over and beyond the bearings 90. The springs 94 of the locator devices now return the devices to their upright postures above the table surface and by moving the sheet rearwardly, the following edge is brought into contact with the fiber plates 92 to align this edge longitudinally on the table and the sheet 23 generally in relation to the track template 24. A block 114 may be secured as by screws to the table 22 so that once the sheet 23 is aligned longitudinally, one end thereof may be brought against the block to locate said sheet in a similar endwise manner.

As will be more fully hereinafter described, when the cutting operation has been completed, the valve 102 will operate the cylinder 99 and cause the piston rod 111 thereof to engage and swing the arm 109 and similarly the shaft 105 and arms 98. This action will effect a rapid removal or ejection of the cut sheet from the table 22, as the devices 77 move forwardly in the table slots 88, and onto the surface of a work bench or table 115 (Fig. 6) where the pattern-cut outline may be broken out from the selvage edge margins of the sheet. Also, upon reversal of the valve 102, the spring 108 will swing the arm 109 in the opposite direction and, through the shaft 105, the arms 98 rearwardly to carry the locator devices 77 back to that position in which they may again function to locate a subsequent sheet of glass.

*Track template and glass cutting mechanism*

The track template 24, beneath which the glass sheet 23 is supported on the table 22 and located by the devices 77 and block 114, comprises an especially formed ring 116 which, as shown in Fig. 2, is materially longer than its width or in any other dimension to accord with the outline of the pattern-cut to be obtained.

That is, as herein disclosed for purposes of illustration, the ring 116 is representative of a pattern outline to be cut from a sheet of glass and intended for use as a one-piece windshield. This cut sheet accordingly is not only twice as long as pattern-cut sheets, necessary for a divided windshield, but may even be materially more than twice as long in order that the sheet, when arranged with a proportionally sized second glass sheet, can be bent to produce a curved one-piece windshield.

The ring 116 is reenforced by similarly shaped rails 117 secured to the undersurface thereof and these rails at the opposite ends of the ring are provided with outwardly disposed bars 118 by which the template 24 may be bodily supported on the frame 21 of the cutting machine. The ends of the bars 118 are secured to posts 119 carried on the end channels 33 of the frame, by bolts 120 and, although not specifically therein shown, the bars 118 and likewise the channel members 33 may be provided with suitable means to afford slight adjustments of the template to be made with reference to its position above the table 22.

As briefly disclosed in an earlier portion of this specification, the template 24 constitutes not only a guide track for the cutting mechanism 25 but also a support for the cutting unit 26 thereof.

The cutting mechanism 25 is adapted to be carried about the template 24 and in uniform relation therewith by a swing arm 121. The swing arm comprises a pair of pivotally connected arm sections 122 and 123, coacting to open and close elbow-wise about a journal and connecting shaft 124. As illustrated in Figs. 1 and 7 of the drawings, the arm section 122 at its end opposite the shaft 124 is journaled on a vertically disposed post 125 mounted on a part of the frame 21. More particularly, the post 125 is secured to a plate 126 mounted on the horizontal channels 41 of the frame structure 37 and is adapted to carry not only the immediate end of the arm section 122 but the driving elements by which the cutting unit 26 is actuated to traverse the track template 24. For this purpose, one end of the post is of reduced diameter and threaded as at 127 to receive a washer 128 and nut 129 above the plate 126.

This post 125 is, as stated above, generally mounted on the bridging structure 37 of the frame 21; in a more especial sense, the post is arranged centrally on the channels 41 thereof and midway between the ends of the frame. Being so arranged, the post carried in a substantially axial position with respect to the template 24 and thus supports the swing arm 121 with ample and well-balanced freedom movement as the arms 122 and 123 thereof are opened and similarly closed elbow-wise. Since the template 24 is practically the equivalent of two pattern-cut sheets of glass required for the divided windshield of an automobile, the scope of movement of the cutting unit 26 thereabout would, unless supported by the swing arm as herein provided, naturally require a much longer and heavier arm or an unwieldly journal for its rotary movement. Thus in locating the post 125 centrally in the frame 21, the swing arm is supported for rotary movement in the axial line of the template and consequently is swung, upon movement of the cutting unit 26, so that the arm sections 122 and 123 operate in a suitable, well-balanced manner.

Beneath the plate, the post carries a spacer sleeve 130, bearings 131 and 132 and interposed spacer sleeves 133 and 134. In this related construction, the sleeve 130 is located at the top and between the under surface of the plate 126 and the inner race 135 of the bearing 131 which is carried on the post 125; the spacer sleeves 133 and 134 are disposed between the outer race 136 of bearing 131 and the similar outer race 137 of bearing 132, the inner race 138 thereof being carried on the post. The inner race 138 is carried endwise of the post by means of a locking arrangement comprising a washer 139, a lock washer 140 and a nut 141 received on the lower threaded end 142 of said post. As is customary in a locking arrangement of this character, the end 142 of the post is slotted, as at 143, to receive the tongue 144 of washer 140 while an outwardly extending tongue 145 is formed to be bent downwardly to secure the nut 141 from rotation.

In a conventional manner, the opposed ends of the spacer sleeves 133 and 134 are outwardly chamfered, as at 146, to be engageable by the tapered end 147 of screws 148 threaded into the wall 149 of the arm section 122. Thus the end 149 of the arm section is bored to receive the outer races 136 and 137 of the bearings 131 and 132 respectively and the respective inner races 135 and 138 which are carried on the post 125 are affixed in their relative positions by the association of the spacer sleeves 130, 133 and 134, and said outer races 136 and 137 and the locking arrangement afforded by nut 141. Accordingly the arm section 122 is freely rotatable about the post 125 while being adequately carried thereon. By adjusting the spacing between the sleeves 133 and 134 by means of the tapered end 147 of screws 148, the stability of this rotary relation and support for the arm section 122 may be assured once the screws are secured from motion by the lock nuts 150.

Surmounting the arm section 122, there is an especially formed tubular bracket 151 on which is carried a plurality of sprocket wheels 152, 153 and 154, the wheels 152 and 153 actually being an integral double sprocket member having one hub portion 155. The bracket 151 is secured by screws 156 to the upper surface of the end 149 of said arm section and is formed to have a base or shoulder 157, an annular intermediate surface 158 rising therefrom and a threaded end 159 which is provided with a keyway as at 160. The hub 155 of the double sprocket member is carried in press-fit association with a bearing 161 supported on the shoulder 157 and interfitting in alignment with the annular surface 158, said hub is secured on said shoulder by a spacer ring 162, the sprocket wheel 154 and a nut 163 threaded onto the end 159 of the bracket. A key 164 is located in the keyway 160 which registers with a similar slotted formation in the bore of the wheel 154. By reason of this construction, the sprocket wheels 152 and 153, while rotating in unison, are freely rotatable with respect to the bracket 151 and arm section 122 while the sprocket 154 is firmly keyed to move with the said bracket and arm. Accordingly the sprocket wheels 152 and 153 may be driven at any desired rate of speed commensurate with the operation of the cutting unit 26 and carry the mechanical drive from the mechanism 30 while the sprocket 154 will only revolve according to the motion imparted to the swing arm 121 or section 122 thereof.

The drive mechanism 30, as best seen in Figs. 1 and 2, comprises a continuously operating motor 165 and a suitable variable speed transmission 166 both of which are mounted on the plates 126 and 167 carried on the channels 41 of the frame. As herein provided, the shafts of the motor and transmission are interconnected by a coupling 168; the end of the control shaft 169 of said transmission is outwardly disposed above the case thereof, while the drive shaft 170 depends downwardly therefrom. The control shaft 169 carries a lever 171 controlled by the cam 29 while the drive shaft 170 at its lower end is provided with a sprocket wheel 172.

Also as will be noted in Figs. 1 and 2, the cam 29 is formed on a plate 173 carried by a vertically disposed shaft 174 journaled in bearings 175 at least one of which preferably is of the thrust type to support said shaft. The bearings are secured to a bracket 176 mounted on the plate 126. The shaft 174 at its lower end carries a sprocket wheel 177.

Figure 9:
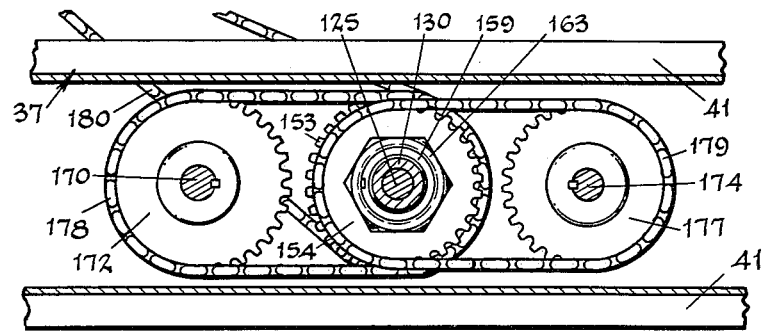
Fig. 9 is a horizontal sectional view taken substantially along line 9—9 of Fig. 1.

By means of a sprocket chain drive, such as that illustrated in Fig. 9, the drive shaft 170 of the transmission 166 may be interjoined with the sprocket wheel 153 by the sprocket wheel 172; the sprocket wheel 152 with the cutting unit 26 and the sprocket wheel 154 with the sprocket wheel 177 on the cam shaft 174. Accordingly a sprocket chain 178 is trained about sprocket wheels 172 and 153 while, as shown, a sprocket chain 179 is similarly trained about sprocket wheels 154 and 177. The sprocket wheel 152, rotating as a unit with sprocket wheel 153, is connected by the sprocket chain 180 trained about said sprocket wheel and operative elements of the cutting mechanism 25, as will be more fully hereinafter described.

Figures 10, 11, 12:
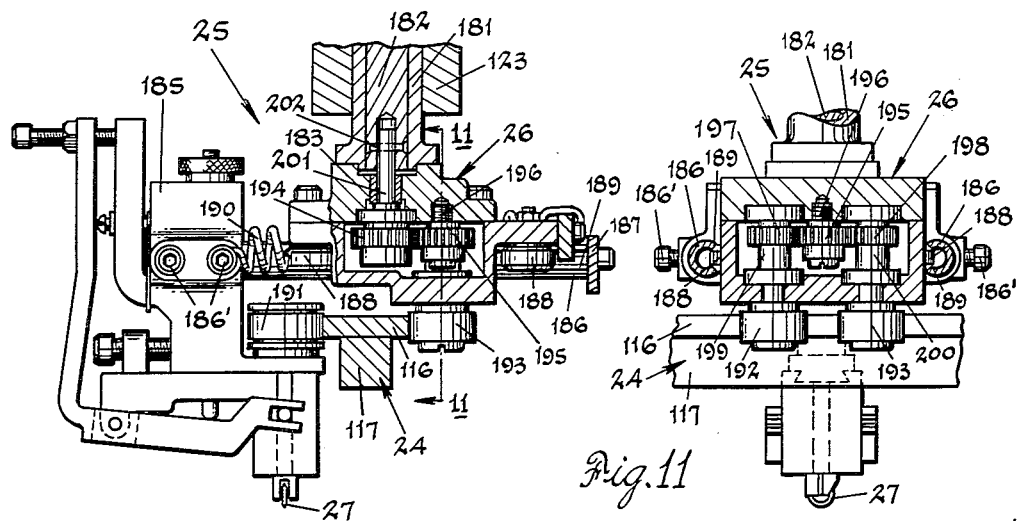
Fig. 10 is a fragmentary, enlarged, cross-sectional detail view of the glass cutting unit.
Fig. 11 is a vertical, transverse sectional view taken substantially on line 11—11 of Fig. 10.
Fig. 12 is a fragmentary horizontal detail view of the cutting unit.
Figure 13:
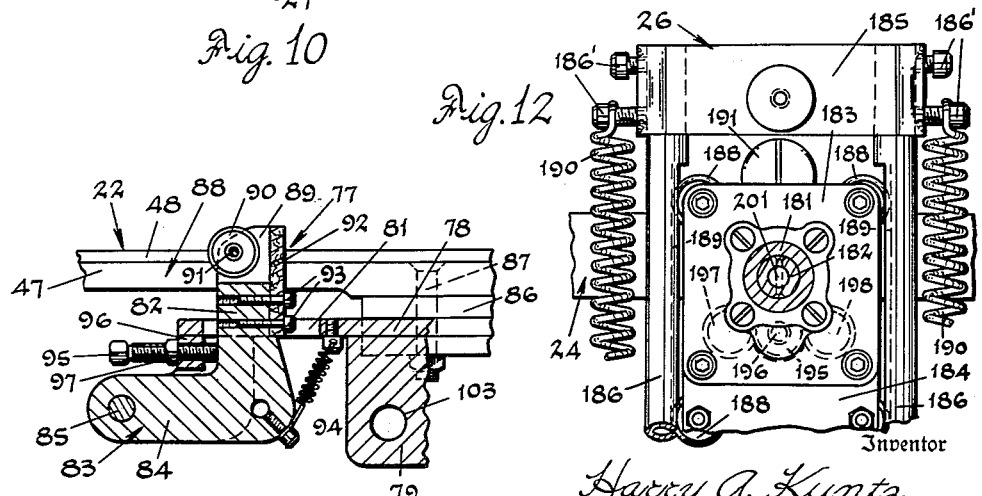
Fig. 13 is an enlarged, cross sectional detail view of the glass ejector mechanism.

The arm section 122 of the swing arm 121 is thus generally supported on the structure 37 of the frame 21 and, more particularly, on the post 125 carried thereon. Due to the pivotal connection of the arm section 122 to the related section 123 on the shaft 124, said section 123 is adapted to be carried within the radial scope of the arm section 122 while being capable of an individual radial movement about the axis of the shaft 124. The outer end of the arm section 123 is formed to receive the journal bushing 181 and shaft 182 of the cutting mechanism 25, as best seen in Fig. 10. The bushing 181 is fastened by screws or the like to the top plate 183 of a housing 184 of the cutting unit 26. In this related construction, the shaft 182 of the cutting mechanism which will subsequently be described as a power transmitting medium for the cutting unit 26, actually functions to carry the associated parts of said unit, or the housing 184 and a coacting element designated the cutter head 185. While the shaft is thus adapted to rotate within the journal bushing 181, it likewise constitutes a vertical spindle upon which the journal bushing, fixedly attached to the housing 184, is freely rotatable to permit bodily turning of the cutting unit 26 in its entirety in agreement with the patterned outline of the track template 24.

The cutter head 185 and the housing 184 of the unit 26 are conventionally associated by means of horizontally disposed, parallel rods 186 secured by screws 186' in the head 185 and extending along the sides of the housing. The ends of the rods adjacent the housing 184 are similarly attached to a cross bar 187 to maintain their parallel relation. By means of rollers or guide wheels 188 (Fig. 12) carried by the housing and located in grooved tracks 189 formed in the rods, the head 185 may move relative to the housing 184 while still being normally supported therefrom. The extent of such movement is flexibly affected by means of a pair of tension springs 190, paralleling the rods 186 and connected at their end loops to the housing 184 and to the cutter head 185 by the screws 186'. The springs tend to urge the parts toward each other and thus serve to effectively maintain bearing members of the housing and cutter head in rolling contact with the track template 24.

As best illustrated in Figs. 10 and 11, the cutter head 185 is provided with a roller bearing 191, while the housing 184 has complementary rollers 192 and 193 engaging the opposite edge of the template. The rollers 191, 192 and 193 guide the cutting unit 26 along the template 24, while at the same time, and by reason of the tension of springs 190, the rollers 192 and 193 provide, through suitable gearing, the required power for propelling the mechanism to produce the desired cutting action. Thus, the rollers 192 and 193 are driven through a train of gears arranged within the housing 184 and which include a drive gear 194 and intermediate gear 195. This intermediate gear is rotatable upon a vertically disposed, threaded stub shaft 196 received in the top plate 183 of the housing 184 and is located between gears 197 and 198 keyed to the shafts 199 and 200 of the rollers 192 and 193, as best seen in Fig. 11.

The drive gear 194 is driven by the shaft 182 through a stub shaft 201 and a pin connection 202 to which the gear 194 is suitably keyed. The traction, or motor power, for the cutting mechanism 25 through the gear 194 and shaft 182, is transmitted by a sprocket chain 203 (Figs. 2 and 6) through the sprocket wheels 204 and 205 about which the sprocket chain is trained. The sprocket wheel 204 is secured to the outwardly extending end of the shaft 182 while the sprocket wheel 205 is fixedly mounted on the shaft 124 which is, as previously stated, formed to provide a journal support for the arm sections 122 and 123. A second sprocket wheel 206 is mounted on the outer end of the shaft 124 and above the sprocket wheel 205. The wheel 206 is operatively associated with the sprocket wheel 152 through the sprocket chain 180. Briefly then, the motive power for the driving gear 194 from the motor 165 is by way of the shaft 170 of the transmission 166 and the sprocket wheel 172 thereon, sprocket chain 178, sprocket wheels 153 and 152, sprocket chain 180, sprocket wheels 206 and 205 and sprocket chain 203 to the sprocket wheel 204 on the shaft 182 carrying drive gear 194.

According to the control imposed upon the transmission 166 and preferably by the lever 171 and cam 29, the drive, through the train of sprocket chains and wheels described above and from the motor 165, will cause the rollers 192 and 193, cooperating with the roller 191, to develop traction on the edges of the track template 24, or the ring 116 thereof, and carry the cutting unit 26 thereabout. However, this control is producible to accomplish the two functions through the control shaft 169 and the lever 171 carried thereon. Primarily the lever 171 brings the pressure within the transmission 166 from idling or "neutral" to an operating pressure during the maintenance of which the cutting of the glass sheet is effected; and, in a second phase of control, the lever, cooperates with the cam 29 to vary the amount of existing operating pressure whereby the cutting unit 26 will be caused to slow down in corner areas and accelerate its traversing speed along the curved or straight intervening sides and ends of the template. This function of the coacting lever 171 and the cam 29 is of prime importance since, having gained the requisite speed of motion along and with respect to the materially longer sides of the template 24, the cutting unit must be properly slowed down or reduced at predetermined points in its cutting stroke to insure that the cutting tool or wheel will produce a score line (28) that is of the necessary depth and uniformity throughout its length.

For this purpose, as will be noted particularly in Fig. 2, the cam 29 is formed on the plate 173 to have arcuate sections 207 and 208 conforming proportionately to the lengths of the sides 209 and 210 of the track template 24 and also arcuate sections 211 and 212 conforming, in the same proportional relation, to the ends 213 and 214 of the template. The cam 29 as shown is so located with reference to the template that initially the cutting unit 26 will traverse a portion of the side 209 while the effective area of the cam will be along the arcuate section 207; then while traversing the end 213 the speed of the said unit will be as determined by action of the lever 171 in relation to the section 211 of the cam and so on until the starting point is arrived at on both the side 209 of the template and section 207 of the cam. It will be noted that the arcuate sections 211 and 212 are radially disposed further from the axis of the shaft 174 than are the arcuate sections 207 and 208 and that these alternately located sections are interconnected by substantially flat areas generally indicated at 215.

This is intended to cause the lever 171 to swing back and forth thereby modifying the operative pressures of the transmission 166 while the cutting unit 26 is traversing either of the template sides 209 and 210, to gradually reduce this pressure while traversing a corner, as at 216, and end 213 or 214 and to again increase the pressure when the unit 26 is passing around a corner 216 from an end area back onto a side section. In this way, the cutting unit 26 follows the several portions of the template and carries the cutting tool 27 in a path substantially parallel to the contour of the template. At the same time, however, the cutting unit is caused to gradually and progressively swing on the axis of the shaft 182 according to the curved lines generated to produce any side of the templates' outline or the corner curves interconnecting any of the ends and sides thereof. Consequently when it is found necessary, in a desired outline or contour to be reproduced in the glass sheet, that an interconnecting curve be of materially small radius, the abruptness of this swinging movement enforced upon the cutting unit must be adequately controlled since otherwise the influence of said cutting unit or the associated tool would produce a slurring or irregularity of cut, despite the fact that the said tool 27 is being maintained in contact with the surface to be cut.

In order that a uniformity of depth and regularity of cut can be maintained, a control over the power output from the transmission 166 by response of the lever 171 to the surface of the cam 29 is accomplished in the following manner. The lever 171 is equipped at its related end with a roller 217 which traverses the edge surface of the cam and the period of its control is determined by one complete traversal of the cutting unit 26 about the template 24. That is, the cam 29 on shaft 174 is rotated by the sprocket wheels 154 and 177 and the entrained chain 179, and the sprocket wheel 154 is caused to make one revolution as it is carried on the inner end 149 of the arm section 122. Thus while the roller 217 is in contact with the cam 29 and alternately traversing the "low sections" 207 and 208 and the "high sections" 211 and 212, the lever 171 will be caused to swing the control shaft 169 of the transmission 166 and accordingly reduce or increase the power output between the motor 165 and the transmission drive shaft 170.

When in the operative position as shown in full line c (Fig. 2) the lever will thus be influenced by the cam 29 to control the function of the transmission; however, when in the position shown by broken line d, the lever 171 will have been swung to turn the shaft 169 so as to reduce the operating pressure to the neutral or idling condition in which no drive is imparted to the shaft 170.

Movement of the lever 171 to this idle position is accomplished by means of an electrical device or solenoid 218 and its armature 219 which is attached to the free or opposite end of the lever from the roller 217, by a chain 220. The chain is directed upwardly from the armature 219 over an idler sprocket 221, pivotally carried on a bracket 222 secured to plate 126, and then horizontally to its connection by a clevis 223 to the end of the lever. This solenoid 218 is mounted on the plate 126, carried by the channel members 41, and is actuated, or de-energized, to release its control over the lever 171 at initiation of a cutting operation and is again energized to regain its lever control upon completion of such operation. A spring 224, attached at one of its coiled ends to the lever, between the shaft 169 and the end carrying the roller 217, and at its opposite coiled end to a plate 225 secured to the bracket 176, assists the lever 171 in moving to its operative position relative to the cam 29 and also flexingly maintains the roller 217 thereagainst during an operating cycle. The energization of the solenoid 218 is controlled by suitable circuits as shown diagrammatically in Fig. 16 and as will be described in connection with this figure.

During the course of a cutting operation, several other ancillary operations are caused to take effect which are interlocked in the electrical circuit of the machine to produce an automatic sequence of events and to assure that the cutting machine will perform as is contemplated. For example, the cutting mechanism 25 is locked from movement until the table 22 is elevated; in sequence, a holding circuit is then instituted so that the table remains to support the glass sheet 23 in cutting position; likewise when the cutting mechanism 25 approaches the end of the cut, it automatically de-activates its own motive power and simultaneously produces lowering of the table as the cutting unit 26 stops. Following descent of the table, the ejecting mechanism is operated in sequence to remove the glass from the table 22 and in the course of its operation acts to prevent repetition of its own operation and also generally stop the entire sequence of operation.

Figure 15:
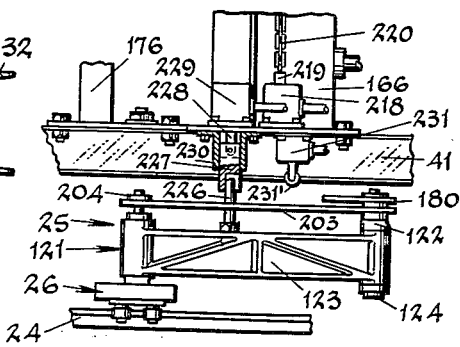
Fig. 15 is a fragmentary view of a portion of the rear of the cutting machine.

The cutting mechanism 25 is restrained from motion by an upright post 226 carried on the arm section 123 in position to be engaged by a notched block 227 secured to the lower end of the armature 228 of a solenoid device 229 and reciprocally mounted in a bracket 230. The solenoid 229 and bracket 230 are mounted on opposite sides of the plate 126 as shown in Fig. 15. Adjacent the bracket 230, on the undersurface of this plate, there is secured a normally closed limit switch 231 having a roller type plunger 231'. The switch and block 227 are so located that the post 226 while being carried circuitously by the arm section 123 will first act to operate or open the switch 231 and then be engaged by the block 227 to halt movement of the unit 26, the operative system for which is substantially opened upon operation of the switch 231 so that the unit 26 actually coasts from the said switch to its idle position as determined by the block 227.

Figure 14:
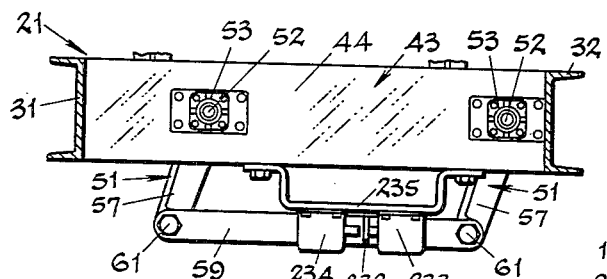
Fig. 14 is a vertical, transverse, sectional view taken substantially on line 14—14 of Fig. 1.

As shown in Fig. 14, one of the bars 59, associated with the bell-cranks 51, carries an angle plate 232 which operates sequentially to open a limit switch 233 and then close a second limit switch 234. As herein shown, the switches 233 and 234 are mounted on a bracket 235 secured to an adjacent transverse channel 44 of the structure 43. Opening of the switch 233 breaks the circuit through the solenoid of the valve 102 which has no immediate reaction other than to prevent accidental operation of the cylinder 99 and arms 98 which would effect the ejection movement of the locator devices 77. The switch 234, however, when closed completes the circuit through a timing relay 236 (Fig. 16) having control over switches 237 and 238. The switch 237, when opened, breaks the circuit of the solenoid 229 after a timed interval thereby allowing the armature 228 to descend and lower the block 227 into position for re-engagement with the post 226 on the arm section 123. In sequential order, the switch 238 is closed by the timing relay to activate or energize circuits which will produce a completed circuit for the solenoid 229 (ultimately broken as described above in connection with switch 237); completes a holding circuit for operating the valve 102 which is presently open at the switch 233 and lastly opens the circuit of the solenoid 218 so that the spring 224 will be effective to swing the roller 217 of lever 171 into engagement with the cam 29 and simultaneously increase the power output of the transmission 166.

Upon completion of a cutting operation and when the table 22 has descended to its original position, the bar 59 will carry the angle plate 232 so as to open the switch 234 and reclose the switch 233. This action completes the circuit to the valve 102 whereupon the locator devices 77 remove the cut sheet from the table 22 to the work table 115. However, in this circuit there is interposed a normally closed limit switch 239 which is opened during the swinging motion of one of the arms 98.

This switch 239, as shown in Fig. 1, is mounted on a vertical channel 45 of the auxiliary frame structure 43 and the arm 240 thereof is positioned so as to be engaged by a plate 241 carried by the adjacent arm 98. Thus as the arm 98 swings rearwardly in the frame 21, the plate 241 strikes the switch arm 240 to open the switch 239 whereupon the valve 102 is automatically reversed and the spring 108 causes the arms 98 on the shaft 105 to swing forwardly in the frame to their original positions. Since, as will be further and more fully described, the circuit through switches 233 and 239 is connected in or controlled by associated circuits which are rendered inoperative upon opening of the switch 231 by the cutting mechanism 25, as it completes the cut, the entire system of the machine becomes idle.

*Electrical system and complete operation*

Operation of this improved cutting machine is controlled by means of an electrical system which automatically actuates the several parts of said machine in a sequential manner once the system itself is set into active operation. An example of such an electrical system is diagrammatically illustrated in Fig. 16 and, briefly stated, includes actuators of the solenoid type for the valves 76 and 102 which produce vertical movements of the table 22 and the reciprocating movement of the glass ejecting mechanism. This system also comprises several magnetically activated devices for releasing the lever 171 associated with the cam 29, for lowering the block 227 which stops the movement of the cutting mechanism 25, and for instituting the functioning of the timer device 236 which produces sequential operation of the several mechanisms within the machine in a proper order. The operation of the cutting machine 20 is controlled by the series of limit switches which have already been described with reference to their arrangement on the machine frame 21 and the actuating members therefor.

In operating the machine, a sheet of glass 23 is placed upon the surface of the table 22 and is slid forwardly by the operator, over the locator devices 77 which are deflected downwardly within the table slots 88 as the glass engages the rollers 90 and passes thereover. When the following edge of the sheet has been moved beyond the said rollers, the springs 94 operate to swing the devices 77 upwardly to their positions above the table surface and the glass sheet is then moved rearwardly until the following edge contacts and is longitudinally aligned by the fiber plates 92 of said locator devices. Simultaneously, the operator may maneuver the sheet endwise until one end edge engages the block 114 so that upon registration with both devices 77 and the block 114, the glass sheet 23 will be properly positioned on the table 22 and with reference to the track template 24 superimposed thereabove.

Upon closure of a manually operable and normally open switch 242, located on the plate 126 and disposed centrally of the frame 21, operation of the cutting machine will be initiated. This switch is included in an electrical circuit that is completed from the main positive supply 243 by line 244, the switch 242 and line 245 to the coil 246 of a relay switch 247, and thence by line 248 to the opposite or return side 249 of the supply lines. The armature 250 of switch 247 carries the bar contacts 251, 252 and 253 which are adapted to close circuits through pairs of fixed contacts 254, 255 and 256, one of each pair of the fixed contacts being connected to the main supply line 243 by branch lines 257, 258 and 259.

The closing of the contacts of the relay switch 247 will first elevate the table 22, then operate the block 227 to release the post 226 on the swing arm 121 of the cutting mechanism 25, then actuate the solenoid 218 to release the lever 171 into contact with the cam 29 and will also create a holding circuit for its integral coil 246 through the normally closed switch 231. When the coil 246 is thus energized, the armature 250 against the action of spring 260 completes a circuit by line 257, contacts 251 and 254, line 261 to the coil 262 of the solenoid actuated valve 76 and by line 263 to the return side 249. The valve 76, in the conventional manner of a reversible four-way valve, controls the fluid pressure and return from pipes 264 and 265, respectively, to pipes 74 and 75 from said valve to the cylinder 68. The valve will now direct fluid under pressure from pipe 264 through pipe 74 to the rear end of the cylinder and cause the piston rod 66 to act upon the bell-cranks 51 through the striker plate 64 on bar 63. This bar is carried by the bars 59 and since they, as previously noted, are tied together with the bell-cranks 51 through the rods 58, said bell-cranks are caused to elevate the table 22 in a substantially perpendicular line of movement. As the table is elevated, the angle plate 232, carried on one of the bars 59, releases the limit switch 233 from its closed position and is moved to engage and close the limit switch 234.

A second control circuit, completed through contacts 252 and 255 from the main supply 243 and lines 257 and 258, includes line 266, and branches 267 and 268 therefrom. The line 266 is connected to one side of a pair of fixed contacts 269 of a relay switch 270; the line 267 connects to one side of the normally closed switch 237, controlled by the timer relay 236, while the branch line 268 connects to one side of the limit switch 234 presently closed by the angle plate 232. This switch 234 completes a circuit through line 271 to the actuating side of the timer relay and thence to the return 249 by line 272 and 263, the power to said relay being from the main 243 by line 273.

The branch supply line 267 connects through switch 237, controlled by the timer relay 236, and by line 274 to the solenoid 229, whose armature 228 carried the block 227. This circuit is completed by line 275 to one side of a pair of fixed contacts 276 of the relay switch 270 and, when bar contact 277 is moved to closure therewith, from the opposite contact 276 by line 278 and 248 to return 249.

The timer relay 236 is adjusted so as to close the switch 238 and in sequence open the switch 237 subsequent to closure of the switch 234. When actuated, the timer relay will thus cause the switch 238 to complete a circuit from supply line 258, contacts 252 and 255, lines 266, 267, 268, switch 234, line 271, line 279, switch 238, line 280 to the coil 281 of relay switch 270 and by lines 282, 278 and 248 to the return 249. The coil of relay switch 270 being energized, the armature 283 is moved against the tension of spring 284 to close the contacts 276 and 277 thereby completing the circuit from the solenoid 229 and causing the same to raise the block 227 to release the post 226 and the swing arm 121 of the cutting unit 26 which is then free to traverse the track template 24.

Simultaneously with closure of the contacts 276 and 277, the bar contact 285 is moved from the fixed contacts 286. The contacts 285 and 286 normally complete a closed circuit from the main supply 243 by lines 273 and 287, contacts 285 and 286 and line 288, to the solenoid 218, and thence by line 289 and 263 to the return 249. When, however, the contacts 285 and 286 are separated, the solenoid 218 is deenergized thereby releasing the armature 219 and allowing the spring 224 to swing the lever 171 so that the roller 217 thereof engages the periphery of the cam 29 and the control shaft 169 of the transmission is turned to increase the pressure thereof from "neutral" to the desired rate of output. The cutting mechanism is now released by the block 227 and the necessary power for its movement will be directed to the drive shaft 170 of said transmission from the motor 165.

Returning now briefly to the relay switch 247 which was initially closed upon actuation of the manual switch 242, the last bar contact 253 carried on the armature 250 completes a circuit from branch supply line 259, contacts 256 and line 290, through normally closed switch 231, and line 291 to line 245 connecting to the coil 246 of said relay switch. This constitutes a holding circuit for the relay switch once the operator removes his temporary manual control over the switch 242 which is immediately opened by the spring 292.

The previously described circuit from supply line 258 and contacts 252 and 255 of relay switch 247 to line 266 and contact 269 is now completed by bar contact 293 of relay switch 270 and the opposite contact 269 and line 294 to line 280 leading to the coil 281 of relay switch 270 thereby obtaining a holding circuit for the same which circuit was originally established upon closure of switches 234 and 238 and dependent upon the operation of the timer relay 236. This relay is now considered as in its inoperative condition so that the switch 238 is again opened while the switch 237 is likewise closed.

The cutting unit 26 now traverses the track template 24 and its rate of speed in so doing is determined by the arcuate sections 207, 208, 211 and 212 of the cam 29 formed on the plate 173. Motion of the unit 26 is produced from the shaft 170 through sprocket wheel 172, sprocket chain 178 to wheel 153 and wheel 152, chain 180 to sprockets 205 and 206 on shaft 124, sprocket chain 203 to sprocket 204 on the shaft 182 of the cutting unit.

The unit 26 is carried by the swing arm 121 and as it traverses the track template, the arm section 123 operates to move elbow-wise with respect to the mating section 122 and while it is being carried radially by said section 122. The section 122 thus describes a full circle while the section 123 swings on the shaft 124 according to the elongation or shortening thereof required by the position of the cutting unit on the template. Since the arm section 122 makes one revolution about the axis of the post 125, the sprocket gear 154 carried on said section will cause the sprocket wheel 177, through the chain 179, to turn the shaft 174 a similar revolution. This will impart to the cam 29 a timed manner of rotation so that as the cutting unit traverses the respective sides and ends, 209, 213, 210 and 214 and corners 216 of the template 24, the roller 217 on the lever 171 will follow the complementary sections 207, 211, 208 and 212 of the cam 29, and cause a perceptible change in speed of the cutting unit as said roller traverses the intervening straight portions 215. The constant speed of the motor 165 will thus be modulated within the variable speed transmission 166 according to the action of the lever 171 and its consequential influence on the control shaft 169 of said transmission.

While the above course of events is being carried out, a circuit is created for the eventual operation of the valve 102 which is connected to the cylinder 99 by pipes 100 and 101 and to convenient supply and return lines by the pipes generally designated 264 and 265. This circuit is completed through fixed contacts 295 and bar contact 296 of relay switch 270 from branch supply lines 273, 287 and 297 to line 298 to normally closed limit switch 239 (on the vertical channel 45 of the structure 43) and by line 299 to coil 300 of the relay switch 301 and by lines 302, 278 and 248 thence to the return 249. The armature 303 of this switch carries bar contacts 304 and 305 which make contact with pairs of fixed contacts 306 and 307, respectively, when the coil 300 is so energized and the armature is moved against tension of spring 308. One side of each pair of contacts 306 and 307 is connected by lines 309 and 310 to the main supply 242, so that when the contacts 304 and 306 engage, a holding circuit for coil 300 will be made by lines 309 and 310, said contacts, and line 311 to line 298 and switch 239.

The contacts 305 and 307 establish a circuit from line 309 to line 312 to one side of the presently open limit switch 233, the opposite side of this switch being connected by line 313 to the coil 314 of the solenoid actuated valve 102.

As the cutting unit 26 approaches its position of rest on the side 209 of the track template, as is shown in Fig. 2, the post 226, on the arm section 123 of the swing arm 121, is carried beneath the plunger 231' of the switch 231 and consequently opens the circuit of lines 290 and 291 therebetween. This produces de-energization of coil 246 and enables the spring 260 to retract the armature 259. In a substantially simultaneous manner, the post 226 enters the notch in block 227 so that further traversing movement of the cutting unit 26 is arrested. Retraction of armature 259 opens the circuits through contacts 251 and 254 thereby de-energizing coil 262 of the solenoid valve 76 and allowing the same to automatically reverse the flow of pressure from the pipes 264 and 74 to the pipe 75 and the return from pipes 265 and 75 to pipe 74. Also, separation of contacts 252 and 255 opens the circuit by line 266, contacts 269 and 293 of relay switch 270 and lines 294 and 280 to the coil 281 thereof to de-energize said coil and allow spring 284 to retract the armature 283. Further, separation of contacts 253 and 256 discontinues the holding circuit of the lines 290 and 291 through the switch 231 to the coil 246.

The table 22 is now lowered as the pressure from valve 76 is conveyed by pipe 75 to the forward end of the cylinder 68 and the bell-cranks 51 are swung downwardly on the shafts 52. This action, which occurs while the circuits of the relay switches 247 and 270 are being restored to their original condition, causes the angle plate 232 on bar 59 to release the limit switch 234 thereby allowing the same to open and break the circuit of lines 268 and 271 to the timing relay 236, and concurrently engage the limit switch 233 to close the same.

Retraction of the armature 283 immediately recloses the circuit of lines 287 and 288 through contacts 285 and 286 to re-energize the coil 218 and cause the armature 219 through the chain 220 and against the spring 224 to swing the lever 171 outwardly from the cam 29 and turn the control shaft 169 so as to reduce the power output of the transmission 166 to neutral. Also, the circuit through lines 297 and 298 by contacts 295 and 296 is opened to switch 239, said switch, however, being closed maintains the circuit to the coil 300 by lines 309, 310, contacts 304 and 306 and line 311. Also, the continuation of the holding circuit for the coil 281 through lines 266, 294 and 278 is broken by separation of the contacts 269 and 293, and further, the return line from the coil 229 by lines 275 and 278 is opened at contacts 276 and 277.

The only remaining active circuit is now from the main supply 243 by lines 309 and 310 to contacts 304, 306 and 305, 307 of relay switch 301 to provide the holding circuit for the coil 300 through the switch 239 and a power supply by line 312 to the switch 233 being closed completes the circuit by line 313 to the coil 314 and thence by lines 315, 289, 272 and 263 to the return 249. Since the switch 233 is closed only when the table is in its lowermost position, actuation of the valve 102 by its coil 314 directs pressure from the pipe 264 to the cylinder pipe 100 and opens a return from pipe 101 to pipe 265. The piston rod 111 now swings the arm 109 on shaft 105, against the tension of the spring 108, to move the related arms 98 and thereby the locator devices 77 to remove the cut sheet of glass 23 from the table 22 to the work bench 115.

As the arms 98 swing forwardly, that one of the same which carries the plate 241 will cause the plate to engage the arms 240 of the switch 239 to open the same. This operation instantaneously effects de-energization of the coil 300 of relay switch 301 upon separation of the contacts 304 and 306 and opening of the circuit to the coil 314 between lines 309 and 312 as the spring 308 retracts the armature 303. The valve 102 is thus automatically reversed to redirect pressure from the pipe 264 to pipe 101 and the return from pipe 100 to pipe 265. Consequently the piston rod 111 is moved into the cylinder assisted by the spring 108 and the arms 98 are swung rearwardly. Upon release of the switch arm 420 from the plate 241, the limit switch 239 is restored to its closed position, however, since the contacts 304 and 306 are similarly separated, there will be no restoration of the original or the holding circuit to the coil 300 of the relay switch 301 and, since the related switches of the entire electrical system are in their respective idle positions, the entire sequential operation of the cutting machine 20 will have been brought to a completion.

The sheet cutting machine, as illustrated and described herein, is particularly well adapted for use in the cutting of patterned outlines from relatively large sheets of glass. As indicated above, such pattern-cut outlines may be of the type employed in the fabrication of automobile windshields of one-piece variety, and for this purpose the glass must precisely conform to the predetermined contour as developed in the template.

According to this invention, such conformity is obtained by carrying the cutting unit of the machine rapidly around the template but at selected points modulating the speed of the unit so that the cutting tool can accommodate itself to a change of direction while still being enabled to produce a continuous cut line of uniform and adequate depth.

A sheet so cut may subsequently be paired with a similarly cut sheet and bent prior to laminating them together with a thermoplastic interlayer to produce a laminated safety-glass structure. When this is done, it is necessary to cut one sheet of the pair slightly smaller than the other in order to insure that the final bent, laminated unit will have straight flush edges entirely around its perimeter. Thus, as is shown in Fig. 3, a sheet of pattern-cut glass, designated A, can be superimposed on a second sheet B and, for purposes of subsequent assembly, their different sizes of contoured perimeter will assure equal registration after bending at all points and essentially the end edges C of the upper sheet A which in the flat are parallel to but located inwardly of the related end edges D of the lower sheet B. The arcs of the sides E and F of the sheet A will also vary somewhat from the related sides E and F of the sheet B so that upon bending there will be a substantially straight movement of related areas of the two sheets and particularly in the corner areas indicated by the lines G. In accordance a procedure of allowing for movement of one sheet relative to the other in the event that they are to be so arranged and bent in pairs, the areas of one sheet will shift in mutual agreement with identical areas of the other sheet and the edges C to move into a final position of alignment with the edges D. Obviously the corresponding sides and ends of each sheet must be cut with provision to reduce the necessity of removing overhanging portions and, if this possibility is removed by the provision of an adequate cutting machine, the ultimate finished product will be of a uniform character.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In a machine for cutting predetermined patterned shapes from sheets of glass or the like, a support for the sheet to be cut having spaced parallel slots therein adjacent one edge thereof, means for raising said support into cutting position and for lowering the same out of cutting position, a template mounted above and in spaced relation to said support, a cutting unit adapted to travel along said template and including a cutting tool engageable with a sheet on said support when the support is in raised position, a platform mounted over said template, a hinged arm, means pivotally connecting one end of said arm to said platform at a point substantially centrally of said template, means for pivotally connecting the opposite end of said arm to said cutting unit, a source of power mounted on said platform and operatively connected to said cutting unit for moving the same along said template, sheet locating and ejecting means mounted for reciprocal movement within said slots, resilient means for normally maintaining said locating means erect to permit a sheet on said support to be located against said locating means but permitting said locating means to be swung in one direction into a position beneath the top of said support upon movement of a sheet to be cut thereover, and means operatively connecting said locating means and said table raising and lowering means to swing said locating means rapidly in said one direction upon lowering of said support out of cutting position to eject the cut sheet from said support.

2. In a machine for cutting sheets of glass or like materials, a frame, a table for supporting the sheet to be cut mounted for vertical movements within the frame and having spaced parallel slots in the surface thereof, a cylinder mounted on the frame and operatively associated with the table to produce upward and downward movements of the same, a track template carried on said frame above the table, locating members for positioning the sheet in proper registration with the template and mounted for reciprocal movement within said slots, means for moving said locating members within the table slots, a cutting unit mounted upon and adapted to travel around the template including a tool for cutting the sheet, a swing arm supporting the cutting unit on the frame and movable therewith during travel of the unit, a source of power for moving the cutting unit around the template, means associated with said table and operable to cause movement of the cutting unit when the table is raised, and a second means associated with the table and operable to cause operation of the locating members moving means when the table is lowered to remove the sheet therefrom.

3. In a machine for cutting sheets of glass or like materials, a frame, a table for supporting a sheet to be cut, said table being mounted for vertical movement within the frame and having spaced parallel slots in the surface thereof, a track template carried on the frame above the table, locating members within said slots for positioning the sheet in proper registration with the template, each of said locating members including a body member having a slot therein and a bifurcated end section and a plate pivotally carried in the bifurcated section and movable in the slot of the body member, a roller carried in free and upper end of said plate, means resiliently holding the plate in an upright position with respect to the body member, the roller of each locating member being adapted to deflect the said plates of said members downwardly against the action of said resilient holding means while maintaining rolling contact with a sheet being loaded on the table, a cutting unit mounted upon and adapted to travel around said template and including a tool for cutting the sheet, and means operable when the cutting unit has travelled around the table to move the locating members within the table slots to remove the sheet from said table.

4. In a machine for cutting sheets of glass or like materials, a frame, a table for supporting a sheet to be cut mounted for vertical movement within the frame and having spaced parallel slots in the surface thereof, a fluid actuated cylinder mounted on the frame and operatively connected to said table to produce raising and lowering thereof, a valve for actuating the cylinder, a track template mounted on said frame in spaced relation above the table, locating members mounted for movement within the slots in said table and for positioning the sheet to be cut in proper registration with the template, a shaft mounted on the frame, arms mounted on the shaft and pivotally connected to the locating members to move the same within the table slots, a fluid actuated cylinder operatively associateed with the shaft for causing reciprocal movement of the arms, a valve for operating the second named cylinder, a cutting unit mounted upon and adapted to travel around the template and including a tool for cutting the sheet, a swing arm supporting said cutting unit centrally of the frame and adapted to rotate therewith as said cutting unit travels around said template, a source of power including a motor and a variable speed transmission, a cam mounted on the frame and operatively associated with the swing arm to rotate therewith, a control lever for the transmission, means carried by said lever adapted to follow the surface of the cam and vary the power output from said transmission according to the surfaces thereof, and means for sequentially operating to move said lever into engagement with said cam after the table is raised and out of said engagement before the table is lowered.

5. In a machine for cutting sheets of glass or like materials, a frame, a table for supporting a sheet to be cut mounted for vertical movement within the frame and having spaced parallel slots in the surface thereof, a fluid actuated cylinder mounted on the frame and operatively connected to said table to produce raising and lowering thereof, a valve for actuating the cylinder, a normally open limit switch mounted on the frame and closed by said table when said table is raised, a normally closed limit switch on the frame and simultaneously opened by the table as the first switch is closed, a track template mounted on the frame in spaced relation above the table, locating members mounted for movement within the slots of the table and for positioning the sheet in proper registration with the template, a shaft journaled on the frame, arms mounted on said shaft and pivotally connected to the locating members to move the same within the slots, a fluid actuated cylinder operatively associated with the shaft for causing reciprocal movement of the arms, a valve for actuating the second cylinder, a second normally closed limit switch carried on the frame and engageable by one of said arms to open the same, a cutting unit mounted upon and adapted to travel around the template including a tool for cutting the sheet, a swing arm supporting said cutting unit centrally of the template and adapted to rotate therewith as the cutting unit travels around said template, a magnetically actuated block for normally restraining the cutting unit from movement, a source of power mounted on said frame above the table and including a motor and a variable speed transmission, a cam having projections therefrom and mounted for rotary movement on said frame, means for rotating said cam synchronously with the swing arm, a control lever operatively connected to the transmission, means carried by the lever adapted to follow the surface of the cam and vary the power output from said transmission according to the projections thereon, means resiliently holding the lever in following engagement with the cam, a magnetically actuated device for withdrawing said lever from engagement with the cam to stop the power output from the transmission, a third normally closed limit switch mounted on the frame and engageable by said cutting unit, an electrical control system for the cutting machine including a timing relay and means manually operable to initiate functioning of the electrical control system whereby the first named valve for the table cylinder will be actuated to raise the same and the normally open limit switch will be closed and the first normally closed limit switch will be simultaneously opened, the said normally open limit switch will activate said timing relay to operate the magnetically actuated block and release the cutting unit for movement and substantially simultaneously deenergize the magnetically actuated device to allow the control lever to be swung into engagement with the cam and the power output from the transmission to be increased thereby causing said cutting unit to travel around the template and cut the sheet, the timing relay then opening the circuit to the magnetically actuated block to release the same for subsequent engagement with the cutting unit, said cutting unit being adapted to engage the third normally closed limit switch upon the completion of a cutting operation whereby the said valve to the table cylinder will be reversed to lower the same and re-open the normally open switch and simultaneously re-close the first named normally closed switch so that a circuit to the second-named valve for the cylinder of the arms will be completed through the second normally closed switch and cause said arms and operatively associated locating members to remove the cut sheet from the table and simultaneously open the second normally closed switch whereupon the last mentioned valve will be reversed to return the locating members to the original positions and terminate functioning of the entire electrical control system.

6. In a machine for cutting sheets of glass or like materials, a frame, a template carried by said frame, a table for supporting a sheet and having parallel slots therein, means for moving said table into an operative and an inoperative position with respect to said frame and template, a cutting unit adapted to travel along said template and including a tool for cutting said sheet in the operative position of the supporting table, locating members within said slots and normally projecting upwardly therefrom for positioning said sheet in proper registry with said template, means for reciprocating said members in said slots, and means associated with said table and operable upon movement thereof to the inoperative position to cause said reciprocating means to eject said sheet from said table.

7. In a machine of the character defined in claim 6, in which said locating members are normally held in said upwardly projecting position by resilient means which enable said members to be swung in one direction beneath the surface of said table upon movement of the sheet to be cut thereover.

8. In a machine for cutting predetermined patterned shapes of sheet material such as glass, a support for the sheet to be cut, a template including relatively long side portions connected by relatively short curving portions mounted above and in spaced relation to said support, a cutting unit adapted to traverse the template and including a cutting tool engageable with a sheet on said support, a framework mounted over said template, a hinged arm, means for pivotally connecting one end of said arm to said framework within the area of said template for swinging movement relative to the framework, means for pivotally connecting the opposite end of said hinged arm to said cutting unit, means for moving said cutting unit along said template, speed control means movable one complete rotation during one complete traverse of said template by said cutting unit, and means arranged in the path of movement of said first-mentioned means and actuated thereby to reduce the driving speed of said source of power as the cutting unit moves toward said curving portions of the template and to increase the driving speed of said cutting unit moving means as said cutting unit moves away from one of said curving portions of the template onto one of the long sides thereof.

9. In a machine for cutting predetermined patterned shapes from sheet material such as glass, a support for the sheet to be cut, a template mounted above in spaced relation to said support, means for positioning the sheet in proper registration with said template and mounted for movement relative to said support, means for moving said positioning means to cause said positioning means to move said sheet out of registration with said template after it has been cut, a cutting unit adapted to travel along said template including a cutting tool engageable with a sheet on said support, a framework mounted over said template, a hinged arm, means for pivotally connecting one end of said arm to said framework within the area of said template for swinging movement relative to the framework, means for pivotally connecting the opposite end of said hinged arm to said cutting unit, and means for moving said cutting unit along said template.

10. In a machine for cutting predetermined patterned shapes from sheet material such as glass, a support for supporting a sheet to be cut, a template mounted in spaced relation to said support and of substantially the same configuration as the sheet to be cut, means for positioning said sheet in proper cutting alignment with said template, means for moving said positioning means relative to said support, a cutting unit adapted to travel along said template and including a cutting tool engageable with a sheet on said support when said sheet is in cutting position, mounting means mounted in spaced relation with respect to both said sheet support means and said template and independently of said template, a hinged arm pivotally connected at one portion thereof to said mounting means within the area of said template, said arm being rotatable 360° about said mounting means as said cutting unit traverses said template, means for pivotally connecting another portion of said hinged arm to said cutting unit, said arm being so formed and connected to said mounting means and said cutter that it projects beyond said template only during a portion of its 360° rotation about said mounting means, and means operatively connected to said cutting unit for moving the same along said template.

11. In a machine for cutting predetermined patterned shapes as claimed in claim 10, in which means are provided for moving said support means toward and away from said template, and wherein means are associated with said support means and operable to initiate movement of the cutting unit when the support is raised.

12. In a machine for cutting predetermined patterned shapes as claimed in claim 10, in which means are provided for moving said support means toward and away from said template, and in which means are provided to move said locating means rapidly in one direction upon movement of said support means to eject a sheet that has been cut on said support away from alignment with said template.

References Cited in the file of this patent

UNITED STATES PATENTS

| Number | Name | Date |
|---|---|---|
| 1,172,933 | Bucknam | Feb. 22, 1916 |
| 1,315,526 | Neal | Sept. 9, 1919 |
| 2,118,170 | Crowley et al. | May 24, 1938 |
| 2,158,466 | Little | May 16, 1939 |
| 2,219,698 | Owen | Oct. 29, 1940 |
| 2,375,378 | Morris | May 8, 1945 |
| 2,508,079 | Spahn | May 16, 1950 |
| 2,508,730 | Stone | May 23, 1950 |
| 2,573,653 | Schrock | Oct. 30, 1951 |
| 2,576,291 | Fletcher | Nov. 27, 1951 |
| 2,618,857 | Goralske | Nov. 25, 1952 |